United States Patent
Seal et al.

(10) Patent No.: US 12,112,388 B2
(45) Date of Patent: Oct. 8, 2024

(54) UTILIZING A MACHINE LEARNING MODEL FOR PREDICTING ISSUES ASSOCIATED WITH A CLOSING PROCESS OF AN ENTITY

(71) Applicant: Accenture Global Solutions Limited, Dublin (IE)

(72) Inventors: Chiranjit Seal, Kolkata (IN); Bula Roy, Pune (IN); Atrayee Chatterjee, Pune (IN); Kaushik Dey, Howrah (IN); Punitha Nithyanandam, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 617 days.

(21) Appl. No.: 17/247,092

(22) Filed: Nov. 30, 2020

(65) Prior Publication Data

US 2022/0172298 A1    Jun. 2, 2022

(51) Int. Cl.
| | | |
|---|---|---|
| G06F 16/25 | (2019.01) | |
| G06F 16/23 | (2019.01) | |
| G06F 16/28 | (2019.01) | |
| G06F 18/214 | (2023.01) | |
| G06F 21/62 | (2013.01) | |
| G06N 5/04 | (2023.01) | |
| G06N 20/00 | (2019.01) | |
| G06Q 10/0631 | (2023.01) | |
| G06Q 10/0639 | (2023.01) | |
| G06Q 40/08 | (2012.01) | |
| G06Q 40/12 | (2023.01) | |

(52) U.S. Cl.
CPC .......... *G06Q 40/12* (2013.12); *G06F 18/214* (2023.01); *G06N 5/04* (2013.01); *G06N 20/00* (2019.01); *G06Q 10/063114* (2013.01); *G06Q 10/06393* (2013.01)

(58) Field of Classification Search
CPC .......... G06Q 40/12; G06Q 10/063114; G06Q 10/06393; G06N 20/00; G06N 5/04; G06F 18/214
See application file for complete search history.

(56) References Cited

U.S. PATENT DOCUMENTS

| | | | | |
|---|---|---|---|---|
| 11,270,389 | B2* | 3/2022 | Lee | G06Q 40/12 |
| 2018/0012119 | A1* | 1/2018 | Datta | G06Q 10/0633 |
| 2018/0240052 | A1* | 8/2018 | Goyal | G06Q 10/0637 |
| 2018/0308178 | A1* | 10/2018 | Engler | G06N 5/02 |

(Continued)

*Primary Examiner* — Talia F Crawley
(74) *Attorney, Agent, or Firm* — Polsinelli PC

(57) ABSTRACT

A device may identify tasks relevant to closing processes for an entity during a period of time, and may generate a request for historical closing data associated with the tasks relevant to the closing processes. The device may provide the request to a server device associated with the entity, and may receive the historical closing data based on providing the request. The device may train a machine learning model, based on the historical closing data, to generate a trained machine learning model, and may receive current closing data associated with tasks relevant to a current closing process. The device may process the current closing data, with the trained machine learning model, to predict issue data identifying at least one potential issue associated with the current closing process, and may provide the issue data to a user device associated with the at least one potential issue.

20 Claims, 10 Drawing Sheets

(56) References Cited

U.S. PATENT DOCUMENTS

| | | | | |
|---|---|---|---|---|
| 2019/0182323 | A1* | 6/2019 | Srinivasan | G06F 9/5072 |
| 2019/0340562 | A1* | 11/2019 | Tayal | G06Q 10/063114 |
| 2019/0385240 | A1* | 12/2019 | Lee | G06N 20/00 |
| 2021/0026829 | A1* | 1/2021 | Goyal | G06F 16/23 |
| 2021/0158146 | A1* | 5/2021 | Singh | G06N 20/20 |
| 2021/0158357 | A1* | 5/2021 | Frennbro | G06Q 30/018 |
| 2022/0027380 | A1* | 1/2022 | Martin | G06Q 40/08 |
| 2022/0028011 | A1* | 1/2022 | Chatman | G06Q 40/12 |

* cited by examiner

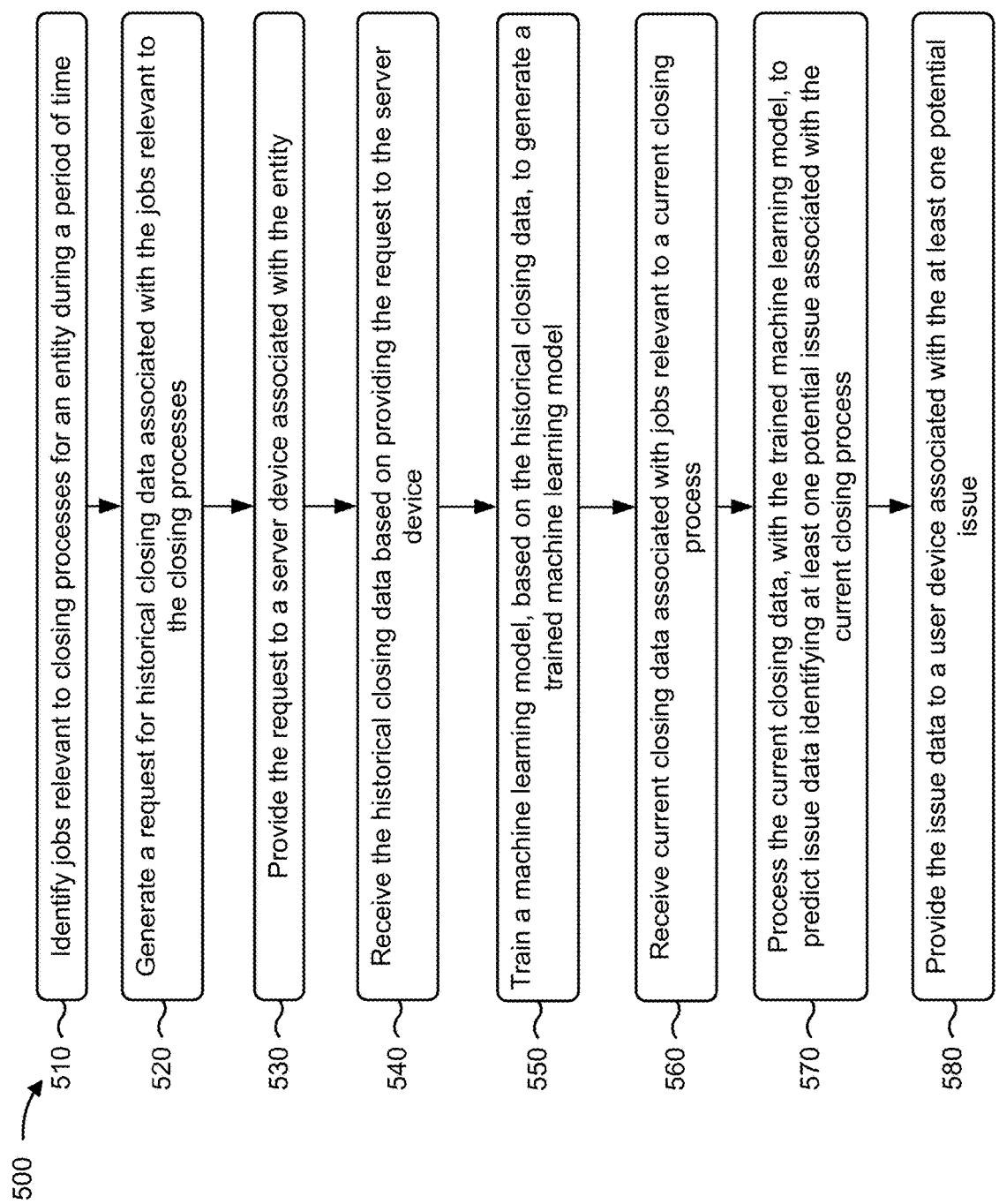

UTILIZING A MACHINE LEARNING MODEL FOR PREDICTING ISSUES ASSOCIATED WITH A CLOSING PROCESS OF AN ENTITY

BACKGROUND

A closing process includes reviewing and reducing account balances of an entity (e.g., a corporation, a business unit of a corporation, and/or a government agency) before an accounting cycle (e.g., a month, a year, and/or the like) closes (e.g., before the accounting cycle ends). The closing process begins with recording a journal entry for each transaction and activity, which leads to a review stage. Completion of the closing process or "closing the books," typically means that journal entries of the entity have been booked, and that high-risk transactions have been reconciled.

SUMMARY

In some implementations, a method may include identifying tasks relevant to closing processes for an entity during a period of time, and generating a request for historical closing data associated with the tasks relevant to the closing processes. The method may include providing the request to a server device associated with the entity, and receiving the historical closing data based on providing the request to the server device. The method may include training a machine learning model, based on the historical closing data, to generate a trained machine learning model, and receiving current closing data associated with tasks relevant to a current closing process. The method may include processing the current closing data, with the trained machine learning model, to predict issue data identifying at least one potential issue associated with the current closing process, and providing the issue data to a user device associated with the at least one potential issue.

In some implementations, a device may include one or more memories, and one or more processors to identify tasks relevant to closing processes for an entity during a period of time, and generate a request for historical closing data associated with the tasks relevant to the closing processes. The one or more processors may provide the request to a server device associated with the entity, and may receive the historical closing data based on providing the request to the server device. The one or more processors may train a machine learning model, based on the historical closing data, to generate a trained machine learning model, and may receive current closing data associated with tasks relevant to a current closing process. The one or more processors may process the current closing data, with the trained machine learning model, to predict issue data identifying at least one potential issue associated with the current closing process. The one or more processors may generate a modification to the current closing process based on the issue data, and may cause the server device to implement the modification to the current closing process.

In some implementations, a non-transitory computer-readable medium may store a set of instructions that includes one or more instructions that, when executed by one or more processors of a device, cause the device to identify tasks relevant to closing processes for an entity during a period of time, and generate a request for historical closing data associated with the tasks relevant to the closing processes. The one or more instructions may cause the device to provide the request to a server device associated with the entity, and receive the historical closing data based on providing the request to the server device. The one or more instructions may cause the device to train a machine learning model, based on the historical closing data, to generate a trained machine learning model, and receive current closing data associated with tasks relevant to a current closing process. The one or more instructions may cause the device to process the current closing data, with the trained machine learning model, to predict issue data identifying at least one potential issue associated with the current closing process, and generate a recommendation based on the issue data. The one or more instructions may cause the device to provide the recommendation to a user device associated with the at least one potential issue, and receive, from the user device, feedback associated with the recommendation. The one or more instructions may cause the device to retrain the machine learning model based on the feedback.

BRIEF DESCRIPTION OF THE DRAWINGS

FIG. 5 is a flowchart of an example process for utilizing a machine learning model for predicting issues associated with a closing process of an entity.

DETAILED DESCRIPTION

Figure 1A:
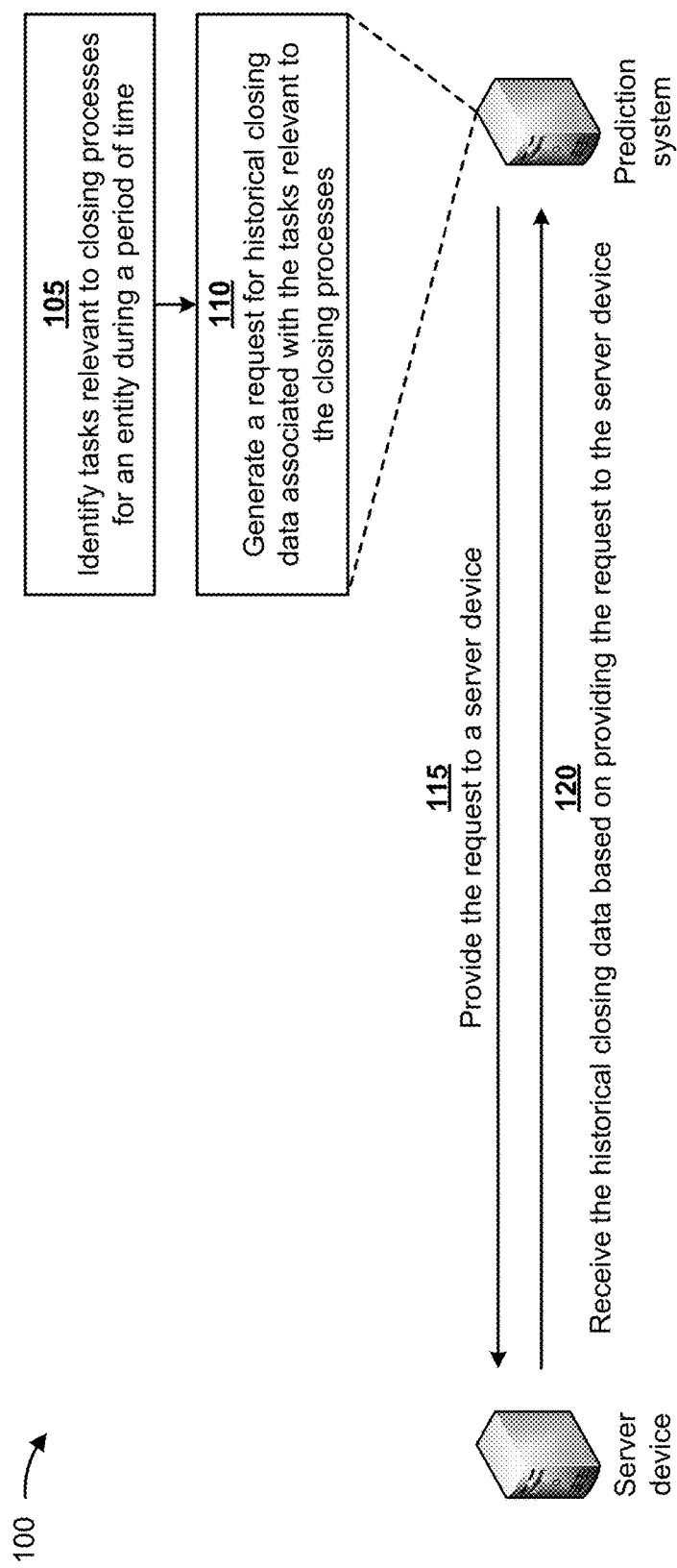
FIGS. 1A-1F are diagrams of an example implementation described herein.

The following detailed description of example implementations refers to the accompanying drawings. The same reference numbers in different drawings may identify the same or similar elements.

An entity (e.g., a corporation, a business unit of a corporation, and/or a government agency) may periodically perform a closing process. The closing process requires performance of several activities prior to a closing date associated with an end of a period of time (e.g., an accounting cycle). Based on the closing process, the entity may be able to generate information regarding profits and losses, generate a balance sheet, generate a financial statement, and/or generate other information associated with an end of an accounting cycle.

In some instances, the entity may include multiple divisions, located worldwide, that participate in the closing process of the entity. The divisions may utilize multiple computing devices to perform multiple activities as part of the closing process, prior to the closing date for the closing process. The use of multiple computing devices (located worldwide) during the closing process may create complexities with respect to the entity ensuring that all of the divisions timely perform the activities in order to meet the closing date for the closing process.

Ensuring that all of the divisions meet the closing date wastes computing resources (e.g., processing resources, memory resources, communication resources, and/or the like), network resources, and/or other resources associated with monitoring and coordinating activities performed by the computing devices, identifying divisions that fail to meet the closing date, performing remedial actions to address delays caused by the divisions that fail to meet the closing date, correcting account balances due to the divisions that fail to meet the closing date, and/or similar issues associated with the divisions failing to meet the closing date.

Some implementations described herein relate to a prediction system that utilizes a machine learning model for predicting issues associated with a closing process of an entity. For example, the prediction system may identify tasks relevant to closing processes for an entity during a period of time, and may generate a request for historical closing data associated with the tasks relevant to the closing processes. The prediction system may provide the request to a server device associated with the entity, and may receive the historical closing data based on providing the request to the server device.

The prediction system may train a machine learning model, based on the historical closing data, to generate a trained machine learning model, and may receive current closing data associated with tasks relevant to a current closing process. The prediction system may process the current closing data, with the trained machine learning model, to predict issue data identifying at least one potential issue associated with the current closing process, and may provide the issue data to a user device associated with the at least one potential issue.

The prediction system may utilize historical closing process data to train a machine learning mode to identify issues in past closing processes and actions taken, in relation to those past closing processes, to remedy the issues. These actions may include actions that remedied the issues and remedies that failed to remedy the issues. The prediction system may utilize the machine learning model to predict issues in a current closing process and to institute proactive actions to prevent the issues in real time. The prediction system may provide information identifying the proactive actions (e.g., recommendations) to devices associated with the issues to enable the issues to be resolved via the devices.

By using the machine learning model to predict the issues and by providing the information identifying the proactive actions to the devices, the prediction system conserves computing resources, network resources, and/or other resources that would otherwise have been wasted in monitoring and coordinating activities performed by the devices, identifying divisions that fail to meet the closing date, performing remedial actions to address delays caused by divisions that fail to meet the closing date, correcting account balances due to the divisions that fail to meet the closing date, and/or similar issues associated with the divisions failing to meet the closing date.

FIGS. 1A-1F are diagrams of an example implementation 100 described herein. Example implementation 100 may be associated with utilizing a machine learning model for predicting issues associated with a closing process of an entity. As shown in FIGS. 1A-1F, example implementation 100 includes a user device associated with a user, a server device, and a prediction system. The user device may include a laptop computer, a mobile telephone, a desktop computer, and/or the like utilized by the user. The server device may include a device that collects and/or determines historical closing data regarding historical tasks relevant to historical closing processes (e.g., historical closing processes associated with one or more entities). The server device may obtain the historical closing data from multiple devices that were used to perform the historical tasks.

The prediction system may include a system that utilizes a machine learning model for predicting issues associated with a closing process of an entity. The entity may include an individual, an organization, a unit of an organization, a business, and/or a unit of a business. In some implementations, the user device, the user, and/or the server device may be associated with the entity. In some instances, the user may be an employee of the entity.

As shown in FIG. 1A, and by reference number 105, the prediction system may identify tasks (e.g., jobs) relevant to closing processes for the entity during a period of time. In some implementations, the prediction system may identify the tasks based on a trigger. For example, the prediction system may identify the tasks based on receiving a closing prediction request to predict issues associated with a closing process for the entity. The closing prediction request may be received from a requesting device. In some implementations, the requesting device may be associated with the entity. The requesting device may include the user device or a device different than the user device. In some implementations, the requesting device may be associated with an administrator of the prediction system.

The closing prediction request may include information regarding the tasks relevant to the closing processes during the period of time. For example, the information regarding the tasks may include information identifying nomenclature of the tasks, information identifying statuses of the tasks, information identifying functions of the entity associated with the tasks, geographical locations associated with the tasks, and/or periods of time associated with the tasks relevant to the closing processes.

The information identifying the nomenclature of the tasks may include titles (or names) of the tasks, abbreviations of the tasks, descriptions of the tasks, and/or other information identifying the tasks. The information identifying the statuses of the tasks may include a status indicating that a task is executing, a status indicating that a task is delayed, a status indicating that a task is ready for execution, a status indicating that a task is scheduled for execution, and/or a status indicating that execution of a task is complete.

The information identifying the functions of the entity associated with the tasks may include information identifying functions for which the tasks are relevant such an accounts receivable function, an accounts payable function, a billing function, a ledger function (e.g., a global ledger function), and/or another accounting and/or business function.

The information identifying the geographical locations associated with the tasks may include information identifying a continent, a country, a state, a city, a geographical region, and/or other geographical information. The geographical locations may correspond to geographical locations where the tasks were performed. The information identifying the periods of time associated with the tasks may include information identifying scheduled completion dates and/or times, information identifying actual completion dates and/or times, information identifying scheduled execution dates and/or times, information identifying actual execution dates and/or times.

In some implementations, the closing prediction request may include information identifying the period of time during which the closing processes occurred. The period of time may identify a period of time associated with one or more of the closing processes (e.g., prior to a current date and/or time). Additionally, or alternatively, the period of time may identify one or more months (e.g., prior to the current date and/or time). Additionally, or alternatively, the period of time may identify one or more fiscal periods (e.g., one or more fiscal years).

Alternatively to the period of time being included in the closing prediction request, the prediction system may determine the period of time based on a threshold number of days from a reference date prior to a current date. For example, the period of time (e.g., associated with a closing process) may include a period of time from the threshold number of days preceding the reference date to the threshold number of days following the reference date. For instance, assume the threshold number of days is four days and the reference date is a last working day of a month. In this instance, the period of time may include the last four days of a first month and the first four days of a second month following the first month. In some instances, the prediction system may transmit a confirmation request (e.g., to the requesting device) to confirm the period of time determined by the prediction.

In addition to, or alternatively to, identifying the tasks based on a trigger, the prediction system may identify the tasks periodically (e.g., every week, every other week, and/or every period of time corresponding to a closing process (e.g., a closing process associated with the entity)). In some implementations, the prediction system may identify the tasks based on information included in historical closing prediction requests associated with one or more entities (e.g., including the entity), information included in another source (e.g., documents, reports, websites, and/or other sources) associated with the one or more entities, and/or other information associated with the one or more entities.

In some implementations, the prediction system may identify different tasks for different closing processes. For example, the prediction system may identify one or more first tasks for a first closing process, one or more second tasks for a second closing process, and so on. In some instances, the prediction system may identify the one or more first tasks based on the first closing process being associated with a first period of time, identify the one or more second tasks based on the second closing process being associated with a second period of time, and so on.

As shown in FIG. 1A, and by reference number 110, the prediction system may generate a request for historical closing data associated with the tasks relevant to the closing processes. For example, after identifying the tasks relevant to the closing processes, the prediction system may generate the request for the historical closing data associated with the tasks relevant to the closing processes. The prediction system may generate the request based on a trigger (e.g., based on the closing prediction request) and/or periodically.

In some implementations, the prediction system may include, in the request, the information regarding the tasks relevant to the closing processes discussed above. For example, the information regarding the tasks may include the information identifying the nomenclature of the tasks, the information identifying the statuses of the tasks, the information identifying the functions of the entity associated with the tasks, the geographical locations associated with the tasks, and/or the periods of time associated with the tasks. The prediction system may further include, in the request, information identifying the period of time associated with the closing processes (discussed above) and information identifying the entity.

As shown in FIG. 1A, and by reference number 115, the prediction system may provide the request to the server device associated with the entity. For example, the prediction system may provide the request to the server device to cause the server device to obtain the historical closing data associated with the tasks. The server device may be associated with the entity, associated with a business unit (or group of business units) of the entity, associated with a group of entities that are in the same type of field of business as the entity, and/or associated with a group of entities that are unrelated to the field of business of the entity. The prediction system may provide the request based on a trigger (e.g., based on the closing prediction request) and/or periodically.

In some implementations, based on receiving the request, the server device may search one or more data structures to obtain the historical closing data associated with the tasks. For example, the server device may search the one or more data structures based on the information regarding the tasks. For instance, the server device may search the one or more data structures to obtain historical closing data that match the information regarding the tasks, the information identifying the period of time, and/or the information identifying the entity.

In some implementations, the prediction system may provide the request to obtain information that may be used to generate key performance indicators (KPIs) associated with future closing processes of the entity. In some examples, the KPIs may be used (e.g., by the prediction system) to predict and/or resolve issues associated with tasks of the future closing processes. The issues may cause delays in completion of the tasks and, accordingly, cause delays in completion of the future closing processes.

As shown in FIG. 1A, and by reference number 120, the prediction system may receive the historical closing data based on providing the request to the server device. For example, the prediction system may receive the historical closing data from the server device based on providing the request to the server device.

The historical closing data may include information regarding historical tasks, information identifying a quantity of the historical tasks, information identifying historical closing dates associated with the historical tasks, information identifying historical target (or scheduled) completion dates and/or times of the historical tasks, information identifying historical actual completion dates and/or times of completion of the historical tasks, information identifying historical target (or scheduled) execution dates and/or times of the historical tasks, and/or information identifying historical actual execution dates and/or times of execution of the historical tasks.

In some implementations, the information regarding the historical tasks may include information identifying historical nomenclature of the historical tasks, information identifying the historical tasks (e.g., identifiers and/or descriptions), information identifying historical statuses of the historical tasks, information identifying historical functions of the entity associated with the historical tasks, information identifying historical geographical locations associated with the historical tasks, information identifying devices that were involved in performing the historical tasks, information regarding historical actions that were performed to cause one or more of the historical tasks to be completed on time, information regarding historical issues that caused one or more of the historical tasks to be delayed. In some instances, the information regarding the historical actions and/or the information regarding the historical issues may be obtained from annotations regarding the tasks (e.g., included in the descriptions).

In some implementations, the historical closing data may be sorted or organized based on a period of time (e.g., one or more months, one or more fiscal periods of time, and/or other periods of time), sorted or organized based on the historical geographical locations associated with the historical tasks, sorted or organized based on the historical functions, and/or other criteria for sorting or organizing the historical closing data.

Figure 1B:
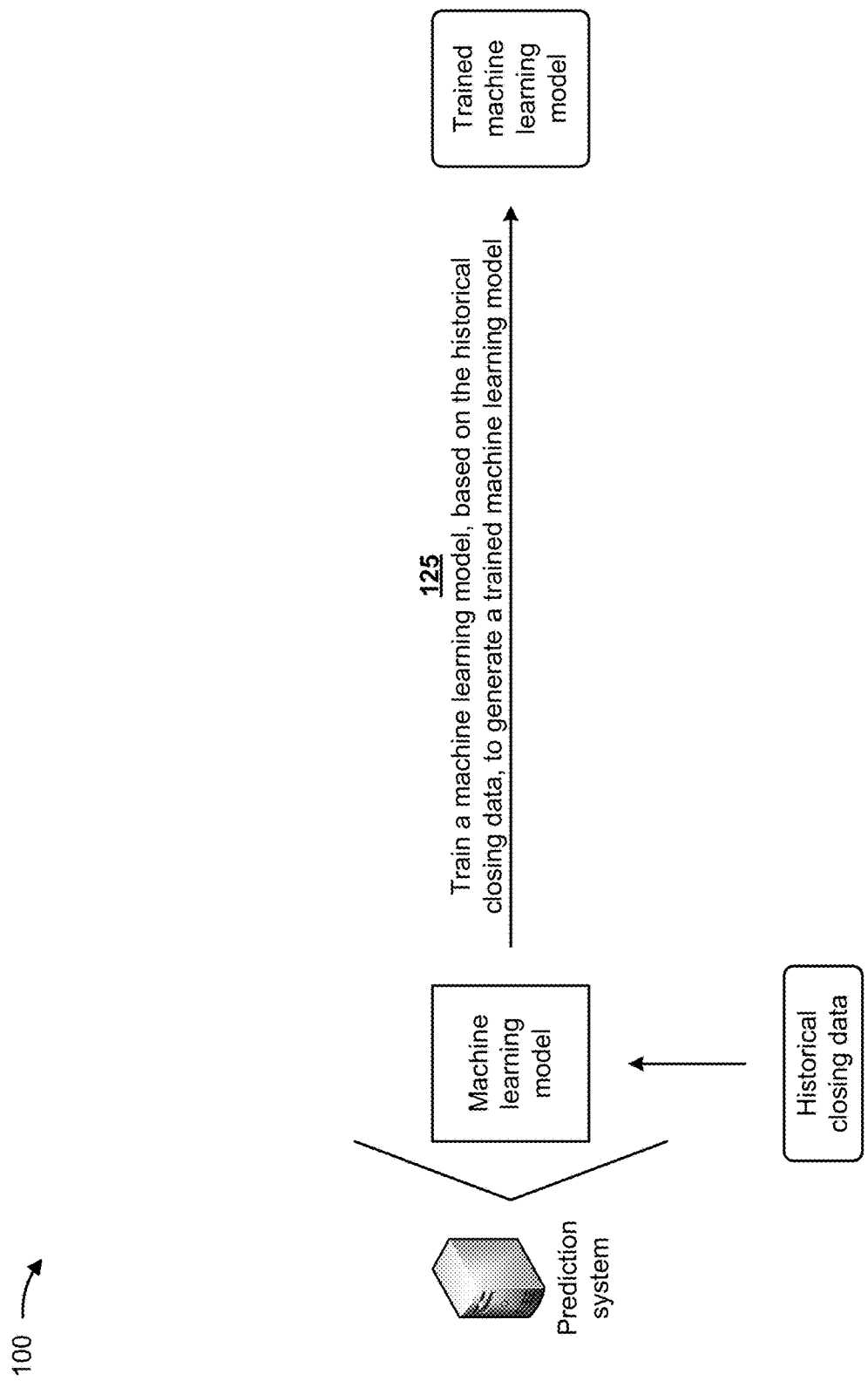

As shown in FIG. 1B, and by reference number 125, the prediction system may train a machine learning model, based on the historical closing data, to generate a trained machine learning model. For example, the prediction system may train the machine learning model using the historical closing data (e.g., discussed above) to generate a trained machine learning model that predicts issues associated with tasks relevant to a closing process. The machine learning model may be trained for the entity, may be trained for a business unit (or group of business units) of the entity, may be trained for a group of entities that are in a same type of field of business as the entity, and/or may be trained for a group of entities that are unrelated to the field of business of the entity. The prediction system may train the machine learning model in a manner similar to the manner described below in connection with FIG. 2.

Alternatively, rather than training the machine learning model, the prediction system may obtain the machine learning model from another system or device that trained the machine learning model. In this case, the other system or device may obtain the historical closing data for use in training the machine learning model, and may periodically receive additional data that the other system or device may use to retrain or update the machine learning model.

In some implementations, as part of the training, the machine learning model may identify (e.g., based on the historical closing data) information regarding one or more first historical tasks that were completed on time (e.g., with respect to the target completion dates and/or times of the one or more first historical tasks), information identifying a quantity of the one or more first historical tasks, information regarding one or more second historical tasks that were delayed or were not completed on time (e.g., with respect to the target completion dates and/or times of the one or more second historical tasks), information identifying a quantity of the one or more second historical tasks, information regarding one or more third historical tasks that are close to being delayed (e.g., tasks that scheduled to be performed on a current date but are not currently being performed), and/or information identifying a quantity of the one or more third historical tasks.

In some implementations, the prediction system may analyze the information regarding the one or more first historical tasks to identify characteristics of tasks that are completed on time. For example, the characteristics may include information identifying nomenclatures of the one or more first historical tasks, information identifying types of one or more first historical tasks, information identifying functions associated with the one or more first historical tasks, information identifying geographical locations associated with the one or more first historical tasks, and/or information identifying actions that caused that the one or more first historical tasks to be completed on time.

In some examples, the prediction system may use the information regarding the one or more first tasks (e.g., the information identifying the actions) to provide recommendations regarding a manner in which predicted issues (e.g., that may delay a task of an upcoming closing process) may be resolved to ensure that the task is completed on time. In some implementations, the prediction system may sort the one or more first historical tasks based on a difference between an actual completion date and/or time and a target completion date and/or time. The prediction system may identify highest ranked tasks out of the one or more first historical tasks and use the information regarding the highest ranked tasks to provide the recommendations.

In some implementations, the prediction system may analyze the information regarding the one or more second historical tasks and/or the information regarding the one or more third historical tasks (hereinafter referred to as "one or more delayed historical tasks") to identify characteristics of tasks that are delayed. For example, the characteristics may include information identifying nomenclatures of the one or more delayed historical tasks, information identifying types of the one or more delayed historical tasks, information identifying functions associated with the one or more delayed historical tasks, information identifying devices that performed the one or more delayed historical tasks, information identifying geographical locations associated with the one or more delayed historical tasks, and/or information regarding historical issues that caused a delay of the one or more delayed historical tasks.

In some examples, the issues may identify reasons for delays associated with the one or more delayed historical tasks. The information regarding the issues may include information identifying the issues (e.g., descriptions of the reasons for the delays) and/or information identifying a measure of severity of the issues. For example, the information identifying the issues may include changes to the entity during a closing process (e.g., organizational/structural changes, mergers, and/or acquisitions), incompleteness of data used by the one or more delayed historical tasks (e.g., incomplete data in an accounting journal, incomplete journal entry for a transaction and/or activity), delays of an approval process associated with the one or more delayed historical tasks, dependencies (e.g., dependencies on other tasks and/or dependencies on different units of the entity), lack of timeliness of one or more processes associated with the one or more delayed historical tasks (e.g., late invoice processing), one or more devices not having a sufficient amount of memory resources and/or processing resources to timely perform the one or more delayed historical tasks, and/or another issue that may cause delays.

The measure of severity of an issue may be indicate a measure of impact of the issue on a closing process (e.g., impact on a timeliness of the closing process). As an example, a measure of severity of a first issue may be low, a measure of severity of a second issue may be medium, a measure of severity of a third issue may be high, and so on.

In some implementations, the prediction system may sort the one or more delayed historical tasks based on a difference between an actual completion date and/or time and a target completion date and/or time. The prediction system may identify lowest ranked tasks out of the one or more delayed historical tasks and use the information regarding the lowest ranked tasks to identify most common characteristics of tasks that are typically (or frequently) delayed. The prediction system may identify a trend with respect to tasks that are typically delayed.

In some implementations, the prediction system may identify the particular tasks that are typically delayed (e.g., identifiers and/or descriptions of the particular tasks), particular functions or units of the entity associated with the tasks that are typically delayed, particular geographical locations associated with the tasks that are typically delayed, particular periods of time that are associated with the tasks that are typically delayed, particular statuses that are associated with the tasks that are typically delayed, scheduled completion dates and/or times that are associated with the tasks that are typically delayed, and/or actual completion dates and/or times that are associated with the tasks that are typically delayed.

For example, the prediction system may determine that a task is likely to be delayed if the task is associated with a first function (e.g., a ledger function) and/or a second function (e.g., an accounts payable function). Additionally, or alternatively, the prediction system may determine that a task is likely to be delayed if the task is associated with particular months. Additionally, or alternatively, the prediction system may determine that a task is likely to be delayed if a status of the task indicates that the task is executing within a threshold amount of time of a scheduled completion date, if the status indicates that the task is ready for execution (but is not executing) within a threshold amount of time of a scheduled execution date, if the status indicates that the task is scheduled for execution (but is not executing) within the threshold amount of time of the scheduled execution date, or if the status indicates that the task is delayed.

In some implementations, the trained machine learning model may receive, as input, data associated with one or more tasks relevant to a closing process and may predict an outcome related to the closing process (e.g., predict that a first task will be completed on time, a second task will be delayed, and so on). Additionally, the trained machine learning model may predict issues that may cause a task to be delayed and may provide one or more recommendations that to resolve the issues.

Figure 1C:
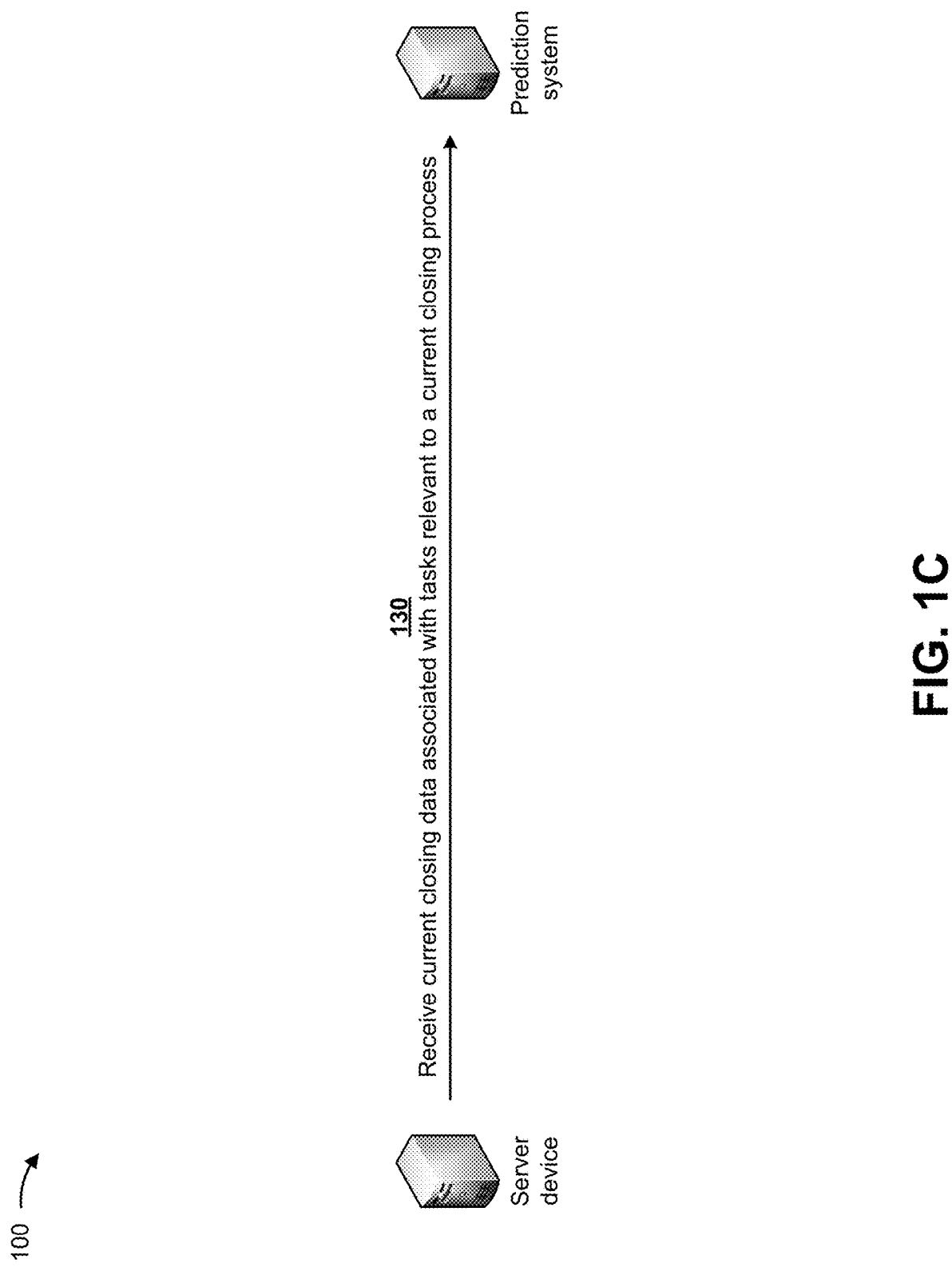

As shown in FIG. 1C, and by reference number 130, the prediction system may receive current closing data associated with tasks relevant to a current closing process. For example, the prediction system may receive a request to predict one or more issues associated with the current closing process. The request may be received from a device associated with the entity and may include the current closing data. The current closing data may include information identifying an entity and/or business unit associated with the current closing data, information identifying nomenclature of the tasks, information identifying the tasks (e.g., identifiers, descriptions, and/or types), information identifying statuses of the tasks, information identifying functions of the entity associated with the tasks, information identifying geographical locations associated with the tasks, information identifying device(s) that are to perform the tasks, information identifying periods of time associated with the tasks (e.g., information identifying target completion dates and/or times and/or information identifying target execution dates and/or times).

In some implementations, the descriptions may indicate whether changes to the entity may be occurring during the current closing process, whether an entirety of data (used by the tasks) has been provided, whether completion of the tasks is associated with an approval process, whether the tasks is associated with dependencies (e.g., dependencies on other tasks and/or dependencies on different units of the entity), and/or whether timeliness issues of one or more processes associated with the tasks has been identified.

In some implementations, the current closing data may include information identifying a period of time of the current closing process. Alternatively, the prediction system may determine the period of time based on a threshold number days, a reference date (e.g., a last working day of a month), and a current date and/or time in a manner similar to the manner described above.

Figure 1D:
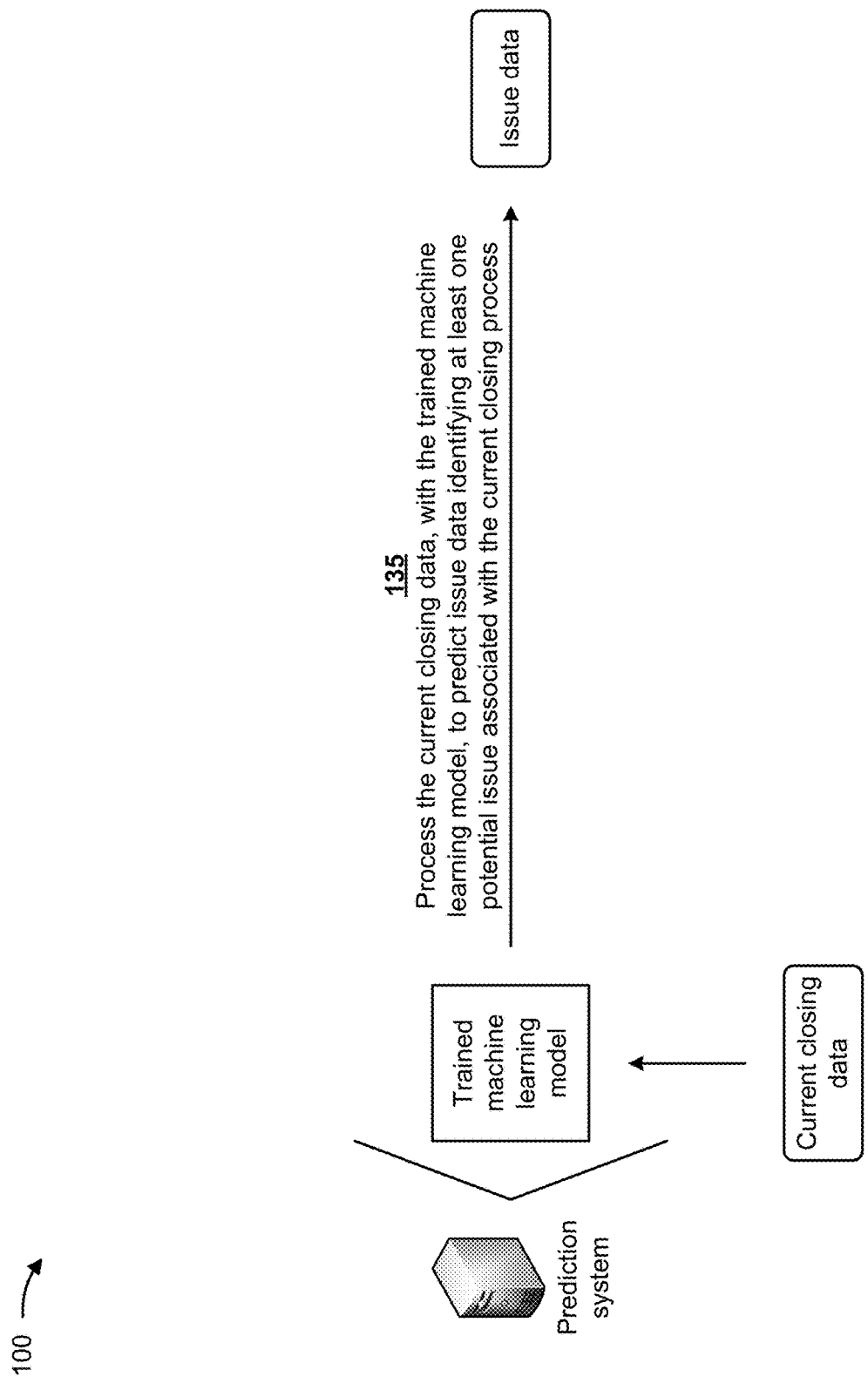

As shown in FIG. 1D, and by reference number 135, the prediction system may process the current closing data, with the trained machine learning model, to predict issue data identifying at least one potential issue associated with the current closing process. For example, the prediction system may provide the current closing data as input to the machine learning model and the machine learning model may predict the at least one potential issue associated with the current closing process and may generate the issue data identifying the at least one potential issue.

In some implementations, the at least one potential issue may include a delay associated with one or more of the tasks relevant to the current closing process. In this regard, the issue data may include information regarding the delay. For example, the information regarding the delay may include information identifying one or more issues that may cause the delay, as described above.

Additionally, or alternatively, the at least one potential issue may include incomplete execution of one or more of the tasks relevant to the current closing process. In this regard, the issue data may include information regarding the incomplete execution. For example, the information regarding the incomplete execution may include information identifying one or more issues that may cause the incomplete execution (e.g., incomplete data in an accounting journal entry).

Additionally, or alternatively, the at least one potential issue may include an error associated with one or more of the tasks relevant to the current closing process. In this regard, the issue data may include information regarding the error. For example, the information regarding the error may include information identifying one or more issues that may cause the error (e.g., dependencies as explained above).

The issue data may include information identifying one or more first tasks (of the tasks relevant to the current closing process) that are predicted to be completed on time, information identifying one or more second tasks (of the tasks relevant to the current closing process) that are predicted to be delayed, information identifying one or more issues predicted to cause the one or more second tasks to be delayed, and/or information identifying one or more recommendations for resolving the one or more issues.

Figure 1E:
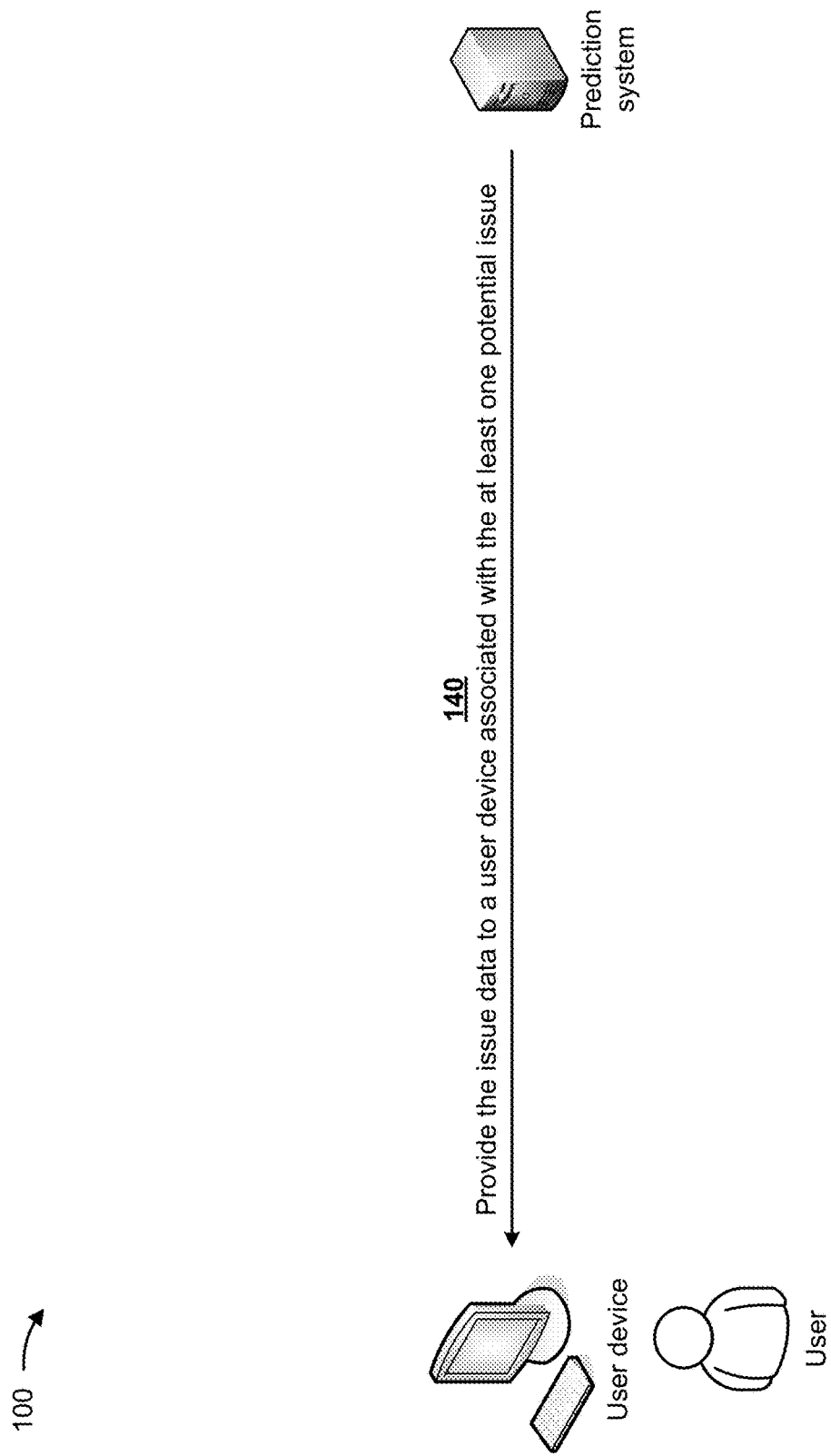

As shown in FIG. 1E, and by reference number 140, the prediction system may provide the issue data to a user device associated with the at least one potential issue. For example, the user device may be the device that submitted the request to predict the one or more issues associated with the current closing process. Accordingly, the prediction system may provide the issue data to the user device in response to receiving the request from the user device.

In some implementations, the request may be received from a device different than the user device. In such instance, the request may include information identifying devices associated with the tasks and may include an instruction to provide the issue data to the devices associated with the tasks. The devices associated with the tasks may include the user device. In this regard, the prediction system may provide the issue data to the devices associated with the tasks.

In some implementations, the request may include information identifying devices associated with the tasks and may include an instruction to provide the issue data to one or more devices associated with one or more of the tasks predicted to be delayed or predicted to cause a delay. The one or more devices may include the user device. In this regard, the prediction system may provide the issue data to the one or more devices.

In some implementations, when providing the issue data, the prediction system may generate a user interface based on the current closing data and the issue data. The user interface may include data indicating a quantity of tasks that are completed out of the tasks relevant to the current closing process, a quantity of tasks that are in progress out of the tasks relevant to the current closing process, a quantity of tasks that are delayed out of the tasks relevant to the current closing process, and/or a quantity of tasks that have not started out of the tasks relevant to the current closing process.

Additionally, or alternatively, the user interface may include the issue data. For example, the user interface may include the information identifying the one or more first tasks that are predicted to be completed on time, the information identifying the one or more second tasks that are predicted to be delayed, the information identifying the one or more issues predicted to cause the one or more second tasks to be delayed, and/or the information identifying the one or more recommendations for resolving the one or more issues.

The one or more recommendations may include a recommendation to begin performing the one or more second tasks in advance of a target date and/or time for performing the one or more second tasks, obtain data for performing the one or more second tasks in advance of the target date and/or time, ensure that one or more tasks (upon which the one or more second tasks depend) are performed in advance of the target date and/or time, ensure that processes associated with the one or more second tasks are performed in advance of the target date and/or time, and/or obtain approval for the one or more second tasks in advance of a target completion date and/or time.

Additionally, or alternatively, the prediction system may determine (e.g., using the trained machine learning model and/or the current closing data) and include (in the user interface) information regarding top tasks most likely to be delayed, top reasons for the delay, top historical tasks that have been delayed, and/or top historical reasons for the historical delays. The prediction system may provide the user interface to the user device.

In some implementations, the prediction system may obtain, from the user device, feedback indicating a measure of accuracy of the prediction. For example, if the prediction system predicts that a task will be delayed, the user device may provide feedback indicating whether the task was actually delayed. Similarly, if the prediction system predicts an issue that may cause of the delay, the user device may provide feedback indicating whether the issue actually caused the delay. In some implementations, the prediction system may utilize the feedback to retrain the machine learning model.

For example, the prediction system may modify a set of training data (used to train the machine learning model) to include information regarding the feedback, thereby improving an accuracy of the machine learning model. Improving the accuracy of the machine learning model may conserve computing resources, network resources, and/or other resources that would have otherwise been used by the machine learning model (prior to the improved accuracy) to predict issues relating closing processes.

In some implementations, when providing the issue data to the user device, the prediction system may provide a closing user interface (e.g., a closing dashboard) implemented using a cloud platform (e.g., an SAP Analytics Cloud platform). The closing dashboard may provide multiple views (or user interfaces). The multiple views may enable data exploration, enable visualization, and/or enable analysis and predictive forecasting of a status of a closing (e.g., a financial closing status) of the entity. In some examples, the closing may be associated with different analytical key performance indicators (KPIs) that facilitate the data exploration, the visualization, and/or the analysis and predictive forecasting.

In some implementations, information included in the multiple screens may be obtained from one or more data structures. In some implementations, a first screen (of the multiple screens) may provide information regarding an overall status of the closing. The information regarding the overall status may include information identifying tasks (for the closing) that are completed, information identifying a period of time associated with the closing, information identifying a fiscal year associated with the closing, information identifying top tasks or types of tasks (associated with the closing) completed during a particular period of time preceding a current date and/or time, and/or information identifying tasks or types of tasks (associated with the closing) completed each period of time (e.g., each month).

In some implementations, a second screen (of the multiple screens) may provide information regarding issues encountered (e.g., over a period of time) during the closing and/or during previous closings. In some examples, the second screen may include information identifying priorities associated with the issues (e.g., one or more first issues may be associated with a first priority, one or more second issues may be associated with a second priority, and so on).

In some implementations, a third screen (of the multiple screens) may provide information regarding tasks (for the closing) over a first time period (e.g., a month) and/or over a second time period (e.g., a year). The information regarding the tasks may include information identifying a quantity of tasks for the closing, a quantity of tasks (for the closing) that are open, a quantity of tasks (for the closing) that are in progress, a quantity of tasks (for the closing) that are currently delayed, a quantity of tasks (for the closing) that are likely to be delayed, and/or a quantity of tasks (for the closing) that are completed. In some examples, the information regarding the tasks may be organized by department, by geographical area/region, and/or by geographical location.

In some implementations, a fourth screen (of the multiple screens) may provide information regarding reasons (e.g., top reasons) for delays associated with historical closings. In some examples, the reasons may include historical reasons (e.g., historical top reasons) for delays of historical closings. Additionally, or alternatively, the reasons may include reasons (e.g., top reasons) for delays of the closing.

In some implementations, a fifth screen (of the multiple screens) may provide information regarding tasks that have been delayed over a period of time prior to and/or including a current date and/or time. In some examples, the information regarding the tasks may include information identifying a quantity of tasks delayed, a period of time (e.g., a fiscal year), information identifying geographical locations (e.g., countries) associated with the tasks or associated with delaying the tasks, and/or a description of the tasks. In some implementations, the information regarding the tasks may be organized based on a period of time (e.g., organized by month) and/or based on the geographical location.

In some implementations, a sixth screen (of the multiple screens) may provide information regarding trends with respect to historical closings and/or the closing. For example, the information regarding the trends may include information identifying issues encountered during historical closing and/or the closing, information identifying issues encountered on a yearly basis, and information identifying issues encountered on a monthly basis. In some implementations, a seventh screen (of the multiple screens) may provide information regarding tasks (e.g., top tasks) that are delayed, information regarding reasons for the tasks that are delayed, information regarding tasks (e.g., top tasks) that are completed, information regarding tasks that are predicted to be delayed. In some examples, one or more of the multiple screens may provide an option to generate reports associated with the information provided on the one or more of the multiple screens.

Figure 1F:
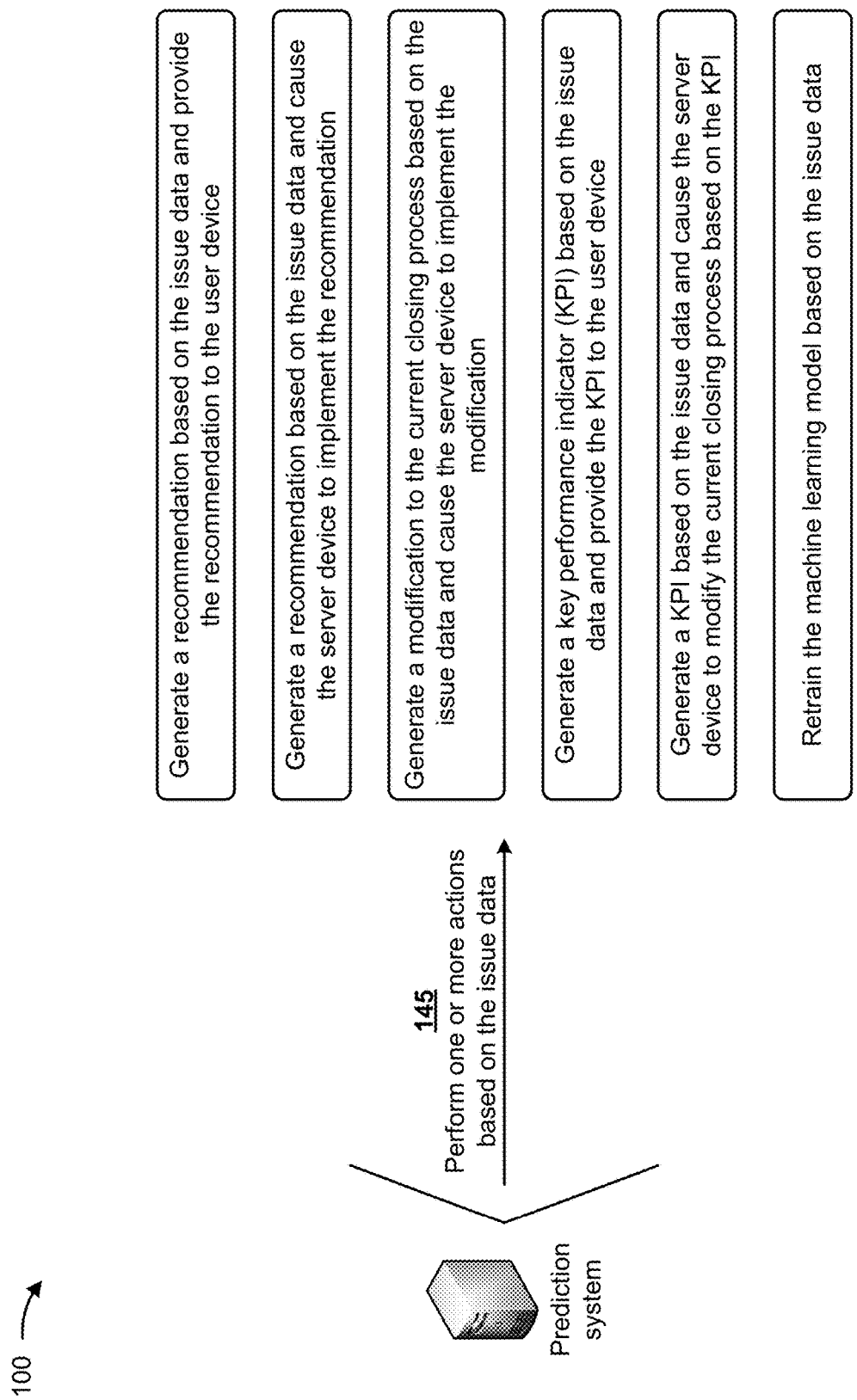

As shown in FIG. 1F, and by reference number 145, the prediction system may perform one or more actions based on the issue data. In some implementations, the one or more actions include generating a recommendation based on the issue data and provide the recommendation to the user device, as described above in connection with FIG. 1D. For example, the prediction system may generate a recommendation based on the issue data and provide the recommendation to the user device.

In some implementations, the one or more actions include generating a recommendation based on the issue data and cause the server device to implement the recommendation. For example, the prediction system generate a recommendation based on the issue data. The recommendation may include one or more of the recommendations described above in connection with FIG. 1D. The prediction system may cause the server device to implement the recommendation. In some implementations, the prediction system may identify (e.g., based on the historical data described above) the server device as a source of one or more of the issues described above. Accordingly, the prediction system may cause the server device to implement the recommendation for the purpose of remedying one or more of the issues. The prediction system may receive, from the server device, feedback associated with implementing the recommendation and retrain the machine learning model based on the feedback, in a manner similar to the manner described above in connection with FIG. 1D.

In some implementations, the one or more actions include generating a modification to the current closing process based on the issue data and cause the server device to implement the modification. For example, the prediction system may generate the modification to the current closing process based on the issue data and cause the server device to implement the modification. In some implementations, the prediction system may identify (e.g., based on the historical data described above) the server device as a source of one or more of the issues described above. Accordingly, the prediction system may cause the server device to implement the modification for the purpose of remedying one or more of the issues. In some implementations, the modification may be based on the recommendation described.

The modification may include removing one or more tasks from the current closing process, adding one or more tasks to the current closing process, modifying dependencies of one or more tasks, modifying a target start date and/or time of one or more tasks, and/or modifying a target completion date and/or time of one or more tasks. The prediction system may receive, from the server device, feedback associated with implementing the modification and retrain the machine learning model based on the feedback, in a manner similar to the manner described above in connection with FIG. 1D.

In some implementations, the one or more actions include generating a key performance indicator (KPI) based on the issue data and providing the KPI to the user device. In some implementations, the one or more actions include generating a KPI based on the issue data and cause the server device to modify the current closing process based on the KPI. In some implementations, the server device may modify the current closing process in manner similar to the manner described above. In some instances, if resources associated with the server device (and/or the user device) are insufficient for implementing the recommendation and/or the modification related to an issue, the prediction system will cause the issue to be documented and resolved at a later date.

In some implementations, the one or more actions include retraining the machine learning model based on the issue data. For example, the prediction system may modify a set of training data (used to train the machine learning model) to include information regarding the feedback, thereby improving an accuracy of the machine learning model. Improving the accuracy of the machine learning model may conserve computing resources, network resources, and/or other resources that would have otherwise been used by the machine learning model (prior to the improved accuracy) to predict issues relating closing processes.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
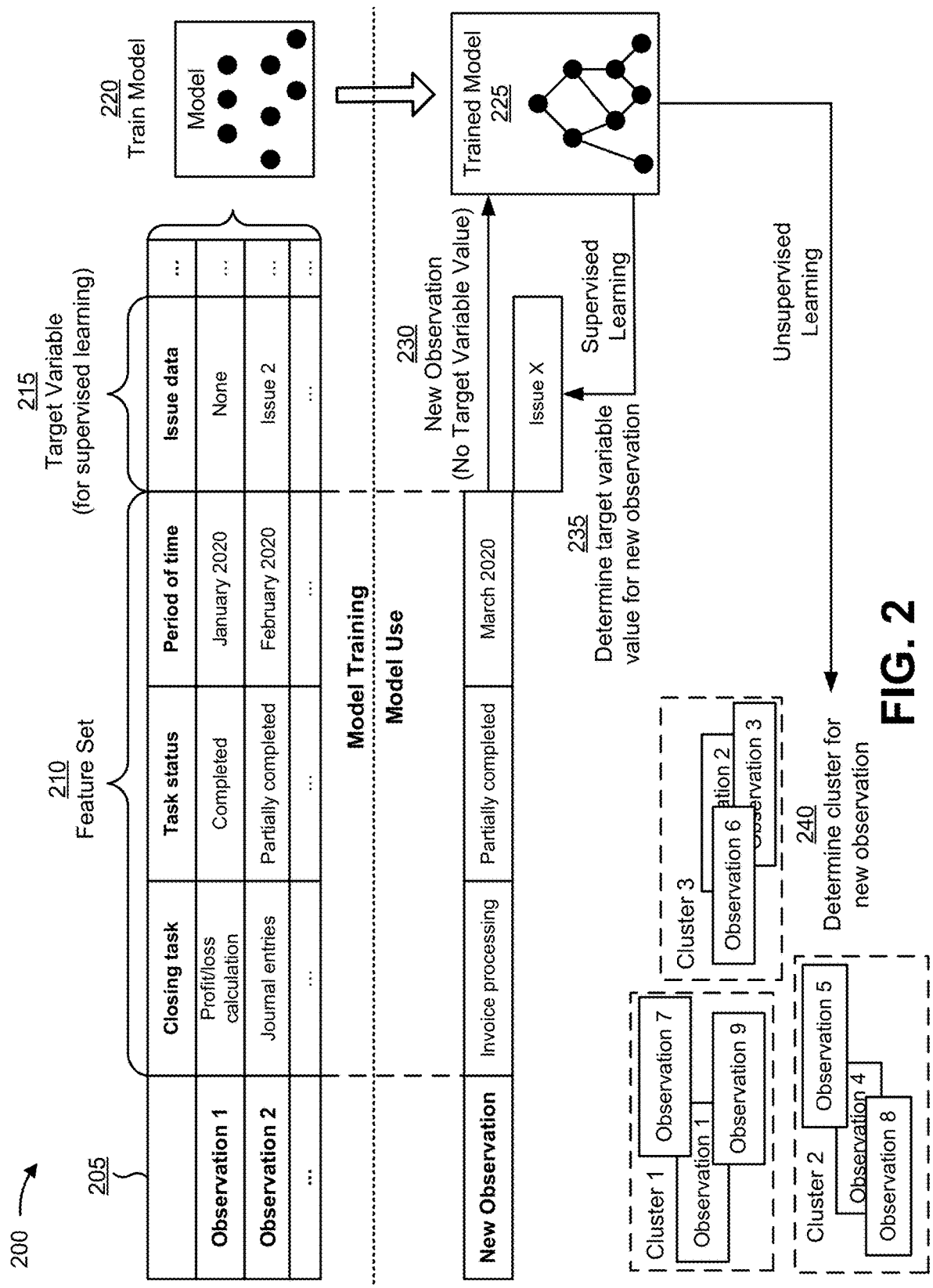
FIG. 2 is a diagram illustrating an example of training and using a machine learning model in connection with predicting issues associated with a closing process of an entity.

FIG. 2 is a diagram illustrating an example 200 of training and using a machine learning model in connection with predicting issues associated with a closing process of an entity. The machine learning model training and usage described herein may be performed using a machine learning system. The machine learning system may include or may be included in a computing device, a server, a cloud computing environment, and/or the like, such as the prediction system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a closing task, a second feature of a task status, a third feature of a period of time, and so on. As shown, for a first observation, the first feature may have a value of a profit/loss calculation, the second feature may have a value of journal entries, the third feature may have a value of January 2020, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is issue data, which has a value of None for the first observation and a value of issue 2 for the second observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of invoice processing, a second feature of partially completed, a third feature of March 2020, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of issue X for the target variable of issue data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a closing task cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a task status cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict issues associated with a closing process of an entity. The machine learning system enables recognition and/or identification of tens, hundreds, thousands, or millions of features and/or feature values for tens, hundreds, thousands, or millions of observations, thereby increasing accuracy and consistency and reducing delay associated with predicting issues associated with a closing process of an entity relative to requiring computing resources to be allocated for tens, hundreds, or thousands of operators to manually predict issues associated with a closing process of an entity.

As indicated above, FIG. 2 is provided as an example. Other examples may differ from what is described in connection with FIG. 2.

Figure 3:
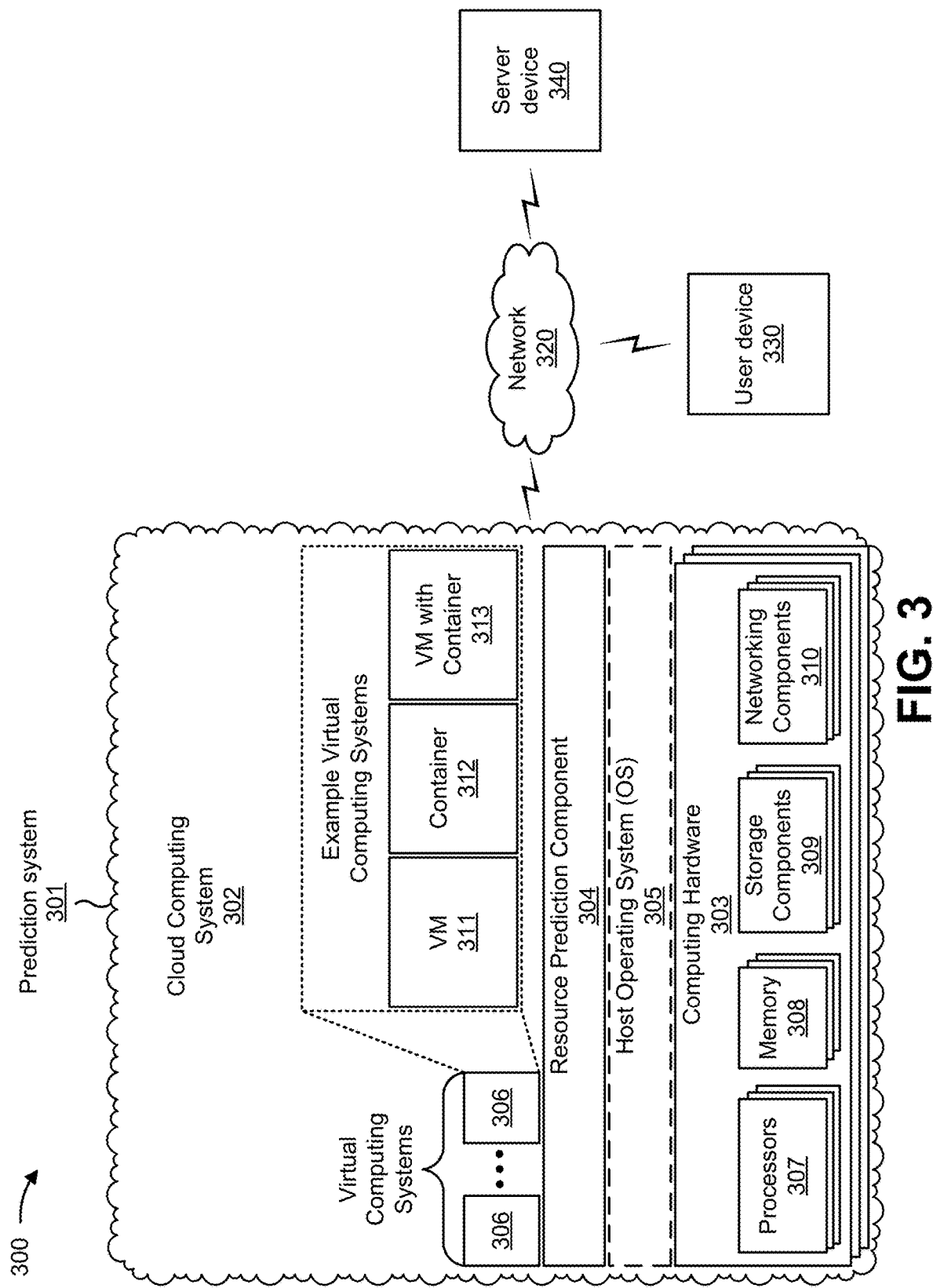
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the prediction system 301 may include one or more elements 303-313 of the cloud computing system 302, may execute within the cloud computing system 302, and/or may be hosted within the cloud computing system 302, in some implementations, the prediction system 301 may not be cloud-based (e.g., may be implemented outside of a cloud computing system) or may be partially cloud-based. For example, the prediction system 301 may include one or more devices that are not part of the cloud computing system 302, such as device 400 of FIG. 4, which may include a standalone server or another type of computing device. The prediction system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information, as described elsewhere herein. Server device 340 may include a communication device and/or a computing device. For example, server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
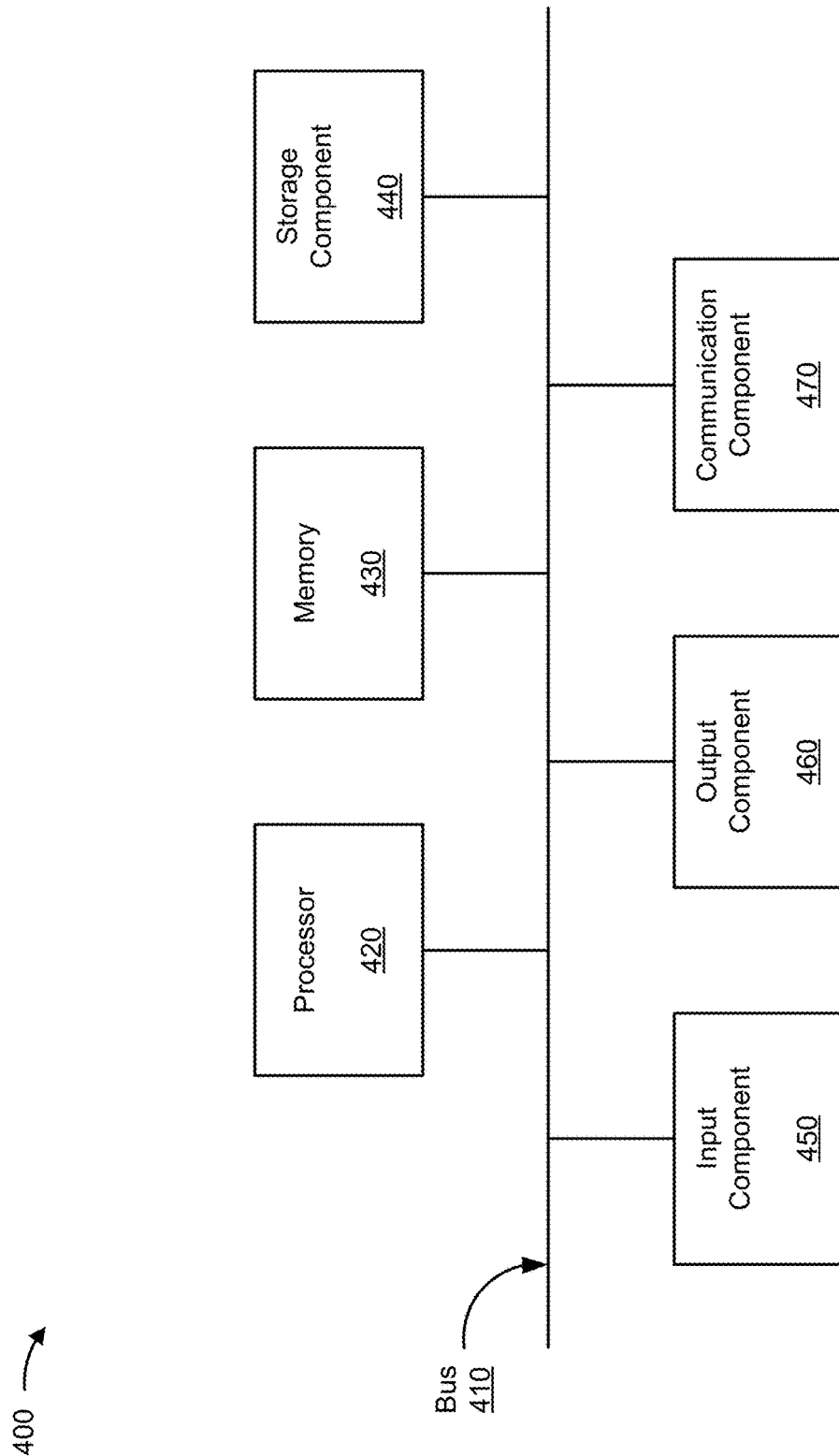
FIG. 4 is a diagram of example components of one or more devices of FIG. 3.

FIG. 4 is a diagram of example components of a device 400, which may correspond to prediction system 301, user device 330, and/or server device 340. In some implementations, prediction system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a machine learning model for predicting issues associated with a closing process of an entity. In some implementations, one or more process blocks of FIG. 5 may be performed by a device (e.g., prediction system 301). In some implementations, one or more process blocks of FIG. 5 may be performed by another device or a group of devices separate from or including the device, such as a user device (e.g., user device 330) and/or a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying tasks relevant to closing processes for an entity during a period of time (block 510). For example, the device may identify tasks relevant to closing processes for an entity during a period of time, as described above.

As further shown in FIG. 5, process 500 may include generating a request for historical closing data associated with the tasks relevant to the closing processes (block 520). For example, the device may generate a request for historical closing data associated with the tasks relevant to the closing processes, as described above.

As further shown in FIG. 5, process 500 may include providing the request to a server device associated with the entity (block 530). For example, the device may provide the request to a server device associated with the entity, as described above.

As further shown in FIG. 5, process 500 may include receiving the historical closing data based on providing the request to the server device (block 540). For example, the device may receive the historical closing data based on providing the request to the server device, as described above.

In a first implementation, process 500 includes one or more of the request for the historical closing data includes a request associated with one or more of nomenclature of the tasks relevant to the closing processes, statuses of the tasks relevant to the closing processes, functions of the entity associated with the tasks relevant to the closing processes, geographical locations associated with the tasks relevant to the closing processes, or periods of time associated with the tasks relevant to the closing processes.

In a second implementation, alone or in combination with the first implementation, the statuses of the tasks relevant to the closing processes includes one or more of a status indicating that a task is executing, a status indicating that a task is delayed, a status indicating that a task is ready for execution, a status indicating that a task is scheduled for execution, or a status indicating that execution of a task is complete.

As further shown in FIG. 5, process 500 may include training a machine learning model, based on the historical closing data, to generate a trained machine learning model (block 550). For example, the device may train a machine learning model, based on the historical closing data, to generate a trained machine learning model, as described above.

In a third implementation, alone or in combination with one or more of the first and second implementations, generating a recommendation based on the issue data and providing the recommendation to the user device, generating a key performance indicator (KPI) based on the issue data and providing the KPI to the user device, or retraining the machine learning model based on the issue data.

In a fourth implementation, alone or in combination with one or more of the first through third implementations, process 500 includes one or more of generating a recommendation based on the issue data and causing the server device to implement the recommendation, generating a modification to the current closing process based on the issue data and causing the server device to implement the modification, or generating a key performance indicator (KPI) based on the issue data and causing the server device to modify the current closing process based on the KPI.

In a fifth implementation, alone or in combination with one or more of the first through fourth implementations, training the machine learning model, based on the historical closing data, to generate the trained machine learning model includes training the machine learning model, based on the historical closing data, to identify one or more tasks having issues. The one or more tasks may be included in the tasks relevant to the closing processes.

As further shown in FIG. 5, process 500 may include receiving current closing data associated with tasks relevant to a current closing process (block 560). For example, the device may receive current closing data associated with tasks relevant to a current closing process, as described above.

As further shown in FIG. 5, process 500 may include processing the current closing data, with the trained machine learning model, to predict issue data identifying at least one potential issue associated with the current closing process (block 570). For example, the device may process the current closing data, with the trained machine learning model, to predict issue data identifying at least one potential issue associated with the current closing process, as described above.

As further shown in FIG. 5, process 500 may include providing the issue data to a user device associated with the at least one potential issue (block 580). For example, the device may provide the issue data to a user device associated with the at least one potential issue, as described above.

In a sixth implementation, alone or in combination with one or more of the first through fifth implementations, process 500 includes generating a user interface based on the current closing data and the issue data, wherein the user interface includes data indicating one or more of a quantity of completed tasks of the tasks relevant to the current closing process, a quantity of in progress tasks of the tasks relevant to the current closing process, a quantity of delayed tasks of the tasks relevant to the current closing process, or a quantity of not started tasks of the tasks relevant to the current closing process; and providing the user interface to the user device.

In a seventh implementation, alone or in combination with one or more of the first through sixth implementations, the machine learning model includes one or more of a regression model, a classification model, or a time series model.

In an eighth implementation, alone or in combination with one or more of the first through seventh implementations, process 500 includes generating a recommendation based on the issue data; providing the recommendation to a user device associated with the at least one potential issue; receiving, from the user device, feedback associated with the recommendation; and retraining the machine learning model based on the feedback.

In a ninth implementation, alone or in combination with one or more of the first through eighth implementations, process 500 includes generating a recommendation based on the issue data; causing the server device to implement the recommendation; receiving, from the server device, feedback associated with implementing the recommendation; and retraining the machine learning model based on the feedback.

In a tenth implementation, alone or in combination with one or more of the first through ninth implementations, process 500 includes generating a modification to the current closing process based on the issue data; causing the server device to implement the modification; receiving, from the server device, feedback associated with implementing the modification; and retraining the machine learning model based on the feedback.

In an eleventh implementation, alone or in combination with one or more of the first through tenth implementations, the at least one potential issue includes one or more of a delay associated with one of the tasks relevant to the current closing process, incomplete execution of one of the tasks relevant to the current closing process, or an error associated with one of the tasks relevant to the current closing process.

In a twelfth implementation, alone or in combination with one or more of the first through eleventh implementations, process 500 includes generating a user interface that includes the issue data and a recommendation for resolving the at least one potential issue, and providing the user interface, for display, to a user device associated with the at least one potential issue.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    identifying, by a device, tasks relevant to closing processes for an entity during a period of time;
    generating, by the device, a request for historical closing data associated with the tasks relevant to the closing processes;
    providing, by the device, the request to a server device associated with the entity;
    receiving, by the device, the historical closing data based on providing the request to the server device,
        wherein the historical closing data comprises information regarding historical issues that caused one or more historical tasks to be delayed including descriptions of historical reasons for historical delays and information identifying a measure of severity of the historical issues;
    identifying, by the device, a trend with respect to the one or more historical tasks based on sorting the one or more historical tasks based on amounts of delays associated with the historical delays;
    training, by the device, a machine learning model, based on the historical closing data, to generate a trained machine learning model,
        wherein the machine learning model is trained to identify structural or organizational changes associated with reasons for the historic delays from the historical closing data, and
        wherein the machine learning model is trained to identify particular tasks that are associated with delays and particular periods of time associated with lengths of the delays;
    receiving, by the device, current closing data associated with tasks relevant to a current closing process;
    processing, by the device, the current closing data, with the trained machine learning model, to predict issue data identifying at least one potential issue associated with the current closing process;
    providing, by the device, the issue data to a user device associated with the at least one potential issue;
    generating, by the device, a modification to the current closing process based on the issue data; and
    causing, by the device, the server device to implement the modification to the current closing process.

2. The method of claim 1, further comprising one or more of:
    generating a recommendation based on the issue data and providing the recommendation to the user device;
    generating a key performance indicator (KPI) based on the issue data and providing the KPI to the user device; or
    retraining the machine learning model based on the issue data.

3. The method of claim 1, further comprising one or more of:
    generating a recommendation based on the issue data and causing the server device to implement the recommendation; or
    generating a key performance indicator (KPI) based on the issue data and causing the server device to modify the current closing process based on the KPI.

4. The method of claim 1, wherein the request for the historical closing data includes a request associated with one or more of:
    nomenclature of the tasks relevant to the closing processes,
    statuses of the tasks relevant to the closing processes, functions of the entity,
    geographical locations associated with the tasks relevant to the closing processes, or
    periods of time associated with the tasks relevant to the closing processes.

5. The method of claim 4, wherein the statuses of the tasks relevant to the closing processes include one or more of:
    a status indicating that a task is executing,
    a status indicating that a task is delayed,
    a status indicating that a task is ready for execution,
    a status indicating that a task is scheduled for execution, or
    a status indicating that execution of a task is complete.

6. The method of claim 1, wherein training the machine learning model, based on the historical closing data, to generate the trained machine learning model comprises:
    training the machine learning model, based on the historical closing data, to identify one or more tasks having issues,
        wherein the one or more tasks are included in the tasks relevant to the closing processes.

7. The method of claim 1, further comprising:
    generating a user interface based on the current closing data and the issue data,
        wherein the user interface includes data indicating one or more of:
            a quantity of completed tasks of the tasks relevant to the current closing process,
            a quantity of in progress tasks of the tasks relevant to the current closing process,
            a quantity of delayed tasks of the tasks relevant to the current closing process, or
            a quantity of not started tasks of the tasks relevant to the current closing process; and
    providing the user interface to the user device.

8. A non-transitory computer-readable medium storing a set of instructions, the set of instructions comprising:
    one or more instructions that, when executed by one or more processors of a device, cause the device to:
        identify tasks relevant to closing processes for an entity during a period of time;
        generate a request for historical closing data associated with the tasks relevant to the closing processes;
        provide the request to a server device associated with the entity;
        receive the historical closing data based on providing the request to the server device,
            wherein the historical closing data comprises information regarding historical issues that caused one or more historical tasks to be delayed including descriptions of historical reasons for historical delays and information identifying a measure of severity of the historical issues;
        identify a trend with respect to the one or more historical tasks based on sorting the one or more historical tasks based on amounts of delays associated with the historical delays;
        train a machine learning model, based on the historical closing data, to generate a trained machine learning model,
            wherein the machine learning model is trained to identify structural or organizational changes associated with reasons for the historic delays from the historical closing data, and
            wherein the machine learning model is trained to identify particular tasks that are associated with delays and particular periods of time associated with lengths of the delays;
receive current closing data associated with tasks relevant to a current closing process;
process the current closing data, with the trained machine learning model, to predict issue data identifying at least one potential issue associated with the current closing process;
generate a recommendation based on the issue data;
provide the recommendation to a user device associated with the at least one potential issue;
receive, from the user device, feedback associated with the recommendation;
generate a modification to the current closing process based on the issue data; and
cause the server device to implement the modification to the current closing process; and
retrain the machine learning model based on the feedback.

9. The non-transitory computer-readable medium of claim 8, wherein the one or more instructions further cause the device to one or more of:
generate a key performance indicator (KPI) based on the issue data and provide the KPI to the user device;
retrain the machine learning model based on the issue data;
cause the server device to implement the recommendation; or
generate another KPI based on the issue data and cause the server device to modify the current closing process based on the other KPI.

10. The non-transitory computer-readable medium of claim 8, wherein the one or more instructions further cause the device to:
generate a user interface based on the current closing data and the issue data,
wherein the user interface includes data indicating one or more of:
a quantity of completed tasks of the tasks relevant to the current closing process,
a quantity of in progress tasks of the tasks relevant to the current closing process,
a quantity of delayed tasks of the tasks relevant to the current closing process, or
a quantity of not started tasks of the tasks relevant to the current closing process; and
provide the user interface to the user device.

11. The non-transitory computer-readable medium of claim 8, wherein the one or more instructions further cause the device to:
cause the server device to implement the recommendation;
receive, from the server device, additional feedback associated with implementing the recommendation; and
retrain the machine learning model based on the additional feedback.

12. The non-transitory computer-readable medium of claim 8, wherein the one or more instructions further cause the device to:
receive, from the server device, additional feedback associated with implementing the modification; and
retrain the machine learning model based on the additional feedback.

13. The non-transitory computer-readable medium of claim 8, wherein the at least one potential issue includes one or more of:
a delay associated with one of the tasks relevant to the current closing process,
incomplete execution of one of the tasks relevant to the current closing process, or
an error associated with one of the tasks relevant to the current closing process.

14. A device, comprising:
one or more memories; and
one or more processors, coupled to the one or more memories, configured to:
identify tasks relevant to closing processes for an entity during a period of time;
generate a request for historical closing data associated with the tasks relevant to the closing processes;
provide the request to a server device associated with the entity;
receive the historical closing data based on providing the request to the server device,
wherein the historical closing data comprises information regarding historical issues that caused one or more historical tasks to be delayed including descriptions of historical reasons for historical delays and information identifying a measure of severity of the historical issues;
identify a trend with respect to the one or more historical tasks based on sorting the one or more historical tasks based on amounts of delays associated with the historical delays;
train a machine learning model, based on the historical closing data, to generate a trained machine learning model,
wherein the machine learning model is trained to identify structural or organizational changes associated with reasons for the historic delays from the historical closing data, and
wherein the machine learning model is trained to identify particular tasks that are associated with delays and particular periods of time associated with lengths of the delays;
receive current closing data associated with tasks relevant to a current closing process;
process the current closing data, with the trained machine learning model, to predict issue data identifying at least one potential issue associated with the current closing process;
provide the issue data to a user device associated with the at least one potential issue;
generate a modification to the current closing process based on the issue data; and
cause the server device to implement the modification to the current closing process.

15. The device of claim 14, wherein the one or more processors are further configured to one or more of:
generate a recommendation based on the issue data and providing the recommendation to the user device;
generate a key performance indicator (KPI) based on the issue data and providing the KPI to the user device; or
retrain the machine learning model based on the issue data.

16. The device of claim 14, wherein the one or more processors are further configured to one or more of:
generate a recommendation based on the issue data and causing the server device to implement the recommendation; or
generate a key performance indicator (KPI) based on the issue data and causing the server device to modify the current closing process based on the KPI.

17. The device of claim 14, wherein the request for the historical closing data includes a request associated with one or more of:
nomenclature of the tasks relevant to the closing processes,
statuses of the tasks relevant to the closing processes,
functions of the entity associated with the tasks relevant to the closing processes,
geographical locations associated with the tasks relevant to the closing processes, or
periods of time associated with the tasks relevant to the closing processes.

18. The device of claim 17, wherein the statuses of the tasks relevant to the closing processes include one or more of:
a status indicating that a task is executing,
a status indicating that a task is delayed,
a status indicating that a task is ready for execution,
a status indicating that a task is scheduled for execution, or
a status indicating that execution of a task is complete.

19. The device of claim 14, wherein the one or more processors, to train the machine learning model, based on the historical closing data, to generate the trained machine learning model, are configured to:
train the machine learning model, based on the historical closing data, to identify one or more tasks having issues,
wherein the one or more tasks are included in the tasks relevant to the closing processes.

20. The device of claim 14, wherein the one or more processors are further configured to:
generate a user interface based on the current closing data and the issue data,
wherein the user interface includes data indicating one or more of:
a quantity of completed tasks of the tasks relevant to the current closing process,
providing the user interface to the user device.

* * * * *